US010599603B1

(12) United States Patent
Agrawal et al.

(10) Patent No.: US 10,599,603 B1
(45) Date of Patent: Mar. 24, 2020

(54) FORWARDING ELEMENT INTEGRATED CIRCUIT CHIP WITH SEPARATE I/O AND SWITCHING TILES

(71) Applicant: Barefoot Networks, Inc., Santa Clara, CA (US)

(72) Inventors: Anurag Agrawal, Santa Clara, CA (US); Alain Loge, Mountain View, CA (US)

(73) Assignee: Barefoot Networks, Inc., Santa Clara, CA (US)

( * ) Notice: Subject to any disclaimer, the term of this patent is extended or adjusted under 35 U.S.C. 154(b) by 0 days.

(21) Appl. No.: 15/896,018

(22) Filed: Feb. 13, 2018

Related U.S. Application Data

(60) Provisional application No. 62/612,059, filed on Dec. 29, 2017.

(51) Int. Cl.
*G06F 13/40* (2006.01)
*H03K 17/81* (2006.01)

(52) U.S. Cl.
CPC ......... *G06F 13/4072* (2013.01); *H03K 17/81* (2013.01); *G06F 2217/64* (2013.01)

(58) Field of Classification Search
CPC .............................. G06F 13/4072; H03K 17/81
(Continued)

(56) References Cited

U.S. PATENT DOCUMENTS 5,502,621 A * 3/1996 Schumacher ........... H01L 23/50
257/692
6,355,980 B1 * 3/2002 Callahan ............... H01L 23/525
257/686

(Continued)

*Primary Examiner* — Paul R. Myers
(74) *Attorney, Agent, or Firm* — Compass IP Law PC

(57) ABSTRACT

Some embodiments of the invention provide a novel method and chip design for a forwarding chip, that decouples input-output (IO) technology requirements from the technology used in a high bandwidth switching ASIC. In some embodiments, a main die including a latest generation switching chip is coupled to a set of IO dies (e.g., SerDes dies). The main die, in some embodiments, uses a latest technology (e.g., 7 nm nodes) while the IO dies, in some embodiments, use a more mature technology (e.g., 16 nm nodes). Some embodiments provide multiple IO dies that each provide connectivity to external components to the high bandwidth switching ASIC (e.g., a core ASIC die). The multiple dies are mounted on a silicon interposer, in some embodiments, using microbumps to make the connections between the dies and the silicon interposer. Additional connections to the pad are made from each die including to general purpose input-output (GPIO) connections. In some embodiments, the main die and the IO dies make all connections through microbumps on the silicon interposer and some microbumps connect to external components using through-silicon vias (TSVs). The microbumps of the main die, in some embodiments, are arranged so that they are mirrored on either side of the main die and rotationally invariant under a 180 degree rotation. IO dies, in some embodiments, are mounted in a first orientation to connect to a first side of the main die and a second rotated (by 180 degrees) orientation to connect to a second opposite side of the main die.

23 Claims, 14 Drawing Sheets

(58) Field of Classification Search
USPC .......................................................... 710/305
See application file for complete search history.

(56) References Cited

U.S. PATENT DOCUMENTS

| | | | | |
|---|---|---|---|---|
| 6,721,313 | B1* | 4/2004 | Van Duyne | H04L 49/101 |
| | | | | 370/386 |
| 6,747,997 | B1* | 6/2004 | Susnow | H04L 7/0083 |
| | | | | 370/503 |
| 7,661,086 | B1* | 2/2010 | Pitkethly | G06F 1/10 |
| | | | | 257/508 |
| 8,546,955 | B1* | 10/2013 | Wu | H01L 23/5384 |
| | | | | 257/686 |
| 9,190,392 | B1* | 11/2015 | Shinde | H01L 25/0657 |
| 9,882,562 | B1* | 1/2018 | Voogel | H03K 19/0008 |
| 2003/0112031 | A1* | 6/2003 | Agrawal | H03K 19/17744 |
| | | | | 326/41 |
| 2004/0246691 | A1* | 12/2004 | Budell | H01L 23/49838 |
| | | | | 361/767 |
| 2012/0124257 | A1* | 5/2012 | Wu | H01L 25/18 |
| | | | | 710/106 |
| 2013/0111123 | A1* | 5/2013 | Thayer | G06F 13/16 |
| | | | | 711/105 |
| 2015/0076923 | A1* | 3/2015 | Frankel | B81B 7/008 |
| | | | | 307/113 |
| 2015/0262910 | A1* | 9/2015 | Sun | H01L 23/481 |
| | | | | 327/306 |
| 2015/0358084 | A1* | 12/2015 | Lesea | H04B 10/501 |
| | | | | 398/189 |
| 2016/0020759 | A1* | 1/2016 | Bryan | H03K 5/15013 |
| | | | | 327/293 |
| 2016/0293548 | A1* | 10/2016 | Karp | H01L 25/0655 |
| 2016/0305983 | A1* | 10/2016 | Seo | G01R 1/07378 |
| 2017/0359056 | A1* | 12/2017 | Horvath | H05K 1/0228 |
| 2018/0054385 | A1 | 2/2018 | Dharmapurikar et al. | |
| 2018/0102776 | A1* | 4/2018 | Chandrasekar | H01L 23/49838 |

* cited by examiner

FORWARDING ELEMENT INTEGRATED CIRCUIT CHIP WITH SEPARATE I/O AND SWITCHING TILES

BACKGROUND

The ever-increasing demand of higher bandwidth switching chips forces earlier adoption of the latest technology nodes (e.g., ≤7 nm). Monolithic die solutions require that a serializer/deserializer (SerDes), a key element of all switching ASICs, must be available on the same technology nodes as the core logic. A solution that breaks the dependency on SerDes availability on a same technology node as a high-bandwidth switching chip ASIC needs to be developed.

SUMMARY

Some embodiments of the invention provide a novel method and chip design for a forwarding chip, that decouples input-output (IO) technology requirements from the technology used in a high bandwidth switching ASIC. In some embodiments, a main die including a latest generation switching chip is coupled to a set of IO dies (e.g., SerDes dies). The main die, in some embodiments, uses a latest technology (e.g., 7 nm nodes) while the IO dies, in some embodiments, use a more mature technology (e.g., 16 nm nodes).

Some embodiments provide multiple IO dies that each provide connectivity to external components to the high bandwidth switching ASIC (e.g., a core ASIC die). The multiple dies are mounted on a silicon interposer, in some embodiments, using microbumps to make the connections between the dies and the silicon interposer. Additional connections to the pad are made from each die including to general purpose input-output (GPIO) connections. In some embodiments, the main die and the IO dies make all connections through microbumps on the silicon interposer and some microbumps connect to external components using through-silicon vias (TSVs). The microbumps of the main die, in some embodiments, are arranged so that they are mirrored on either side of the main die and rotationally invariant under a 180 degree rotation. IO dies, in some embodiments, are mounted in a first orientation to connect to a first side of the main die and a second rotated (by 180 degrees) orientation to connect to a second opposite side of the main die.

A novel protocol for performing register read and write access for different groups of SerDes (e.g., a group of 8 56 Gbps SerDes) within a SerDes die is provided for some embodiments. In some embodiments, the novel protocol uses a set of 5 pins including a management clock input (MCI) sent from the main (core) die (tile) to the IO die (tile), a management data input (MDI) of the IO die used to command, address, and write data, a management clock output (MCO) of the IO die that sends the MCI clock back from the IO die to the main die in order to capture the management data output (MDO) from the main die, and a management data output (MDO) of the IO die used to read data back to the main die. The protocol includes transactions for read transactions, write transactions, reset transactions, control and status register (CSR) access, and an interrupt transaction. The protocol in some embodiments also includes burst read and write operations, atomic operations, etc.

The preceding Summary is intended to serve as a brief introduction to some embodiments of the invention. It is not meant to be an introduction or overview of all-inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

DETAILED DESCRIPTION

Some embodiments of the invention provide a novel method and chip design for a forwarding chip, that decouples input-output (IO) technology requirements from the technology used in a high bandwidth switching ASIC. In some embodiments, a main die including a latest generation switching chip is coupled to a set of IO dies (e.g., SerDes dies). The main die, in some embodiments, uses a latest technology (e.g., 7 nm nodes) while the IO dies, in some embodiments, use a more mature technology (e.g., 16 nm nodes).

Some embodiments provide multiple IO dies that each provide connectivity for external components to the high bandwidth switching ASIC (e.g., a core ASIC die). The multiple dies, in some embodiments, are mounted on a silicon interposer using microbumps to make the connections between the dies and the silicon interposer. Additional connections to the pad are made from each die including to general purpose input-output (GPIO) connections. In some embodiments, the main die and the IO dies make all connections through microbumps on the silicon interposer and make additional connections through microbumps connected to through-silicon vias (TSVs) to connect to external components.

Figure 1:
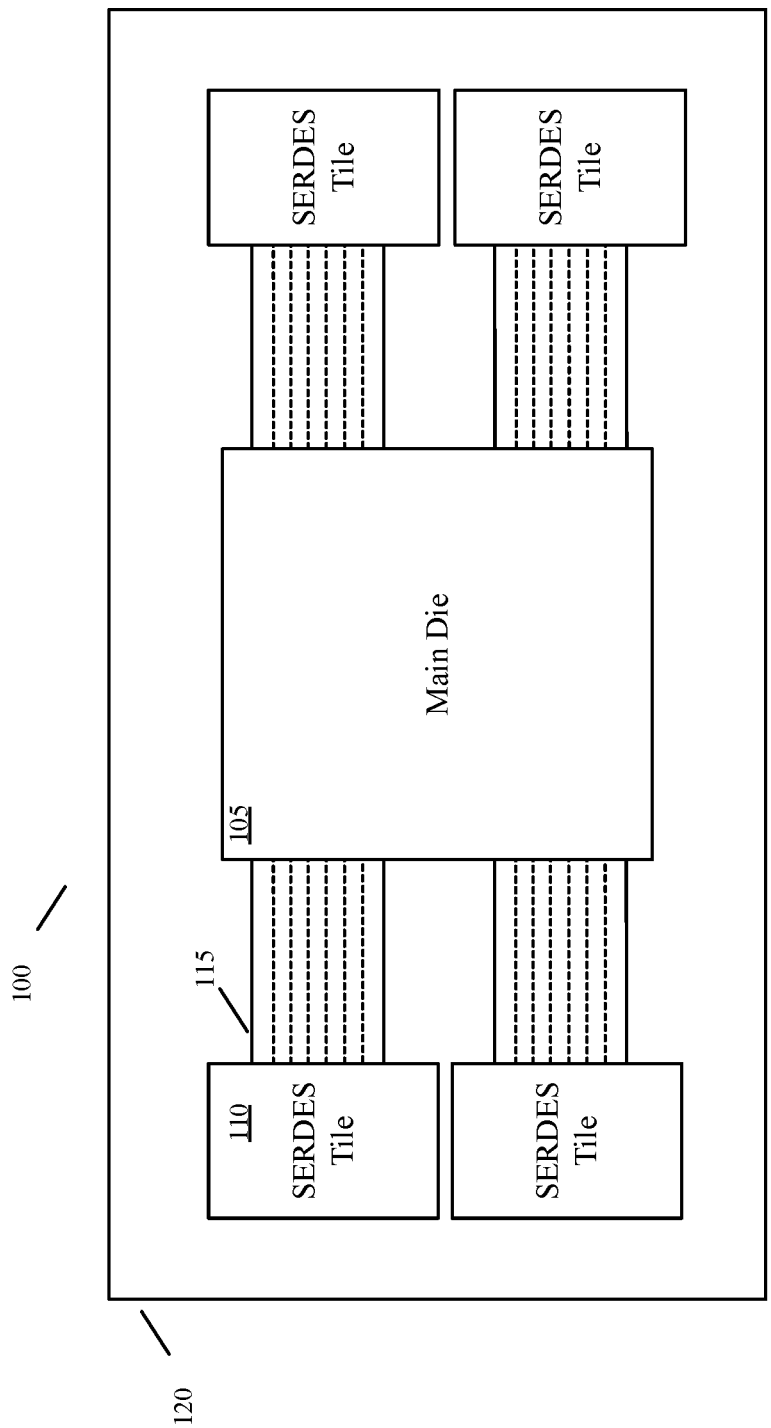
FIG. 1 illustrates a simplified view of a forwarding chip according to some embodiments.

FIG. 1 depicts a simplified view of the forwarding chip 100 including substrate 120, main die 105, SerDes tiles (dies) 110, and connections 115 between the main die 105 and the SerDes tiles 110. In some embodiments, substrate 120 is a silicon interposer that includes a set of microbumps on one face to which main die 105 and SerDes tiles 110 form connections. The set of microbumps includes microbumps that form connections between main die 105 and SerDes tiles 110, as well as microbumps that connect to through-silicon vias (TSVs) that provide connections with external components. In some embodiments, the external connections are made through a pad that provides the connectivity to external components.

The separation between the main die containing switching logic or fabric and a set of IO dies (e.g., SerDes dies or tiles) allows for integrating different technology standards (e.g., a 7 nm based main die integrated with a 16 nm based SerDes tile). The separation also allows each element (i.e., switching fabric and IO die) to be improved separately without having to redesign an entire die when only one component of the chip functionality is being improved. Incremental improvements are thus able to be made more easily and alternative chip designs can be developed that take advantage of a pre-existing IO or main (e.g., switching fabric) die.

Figure 2:
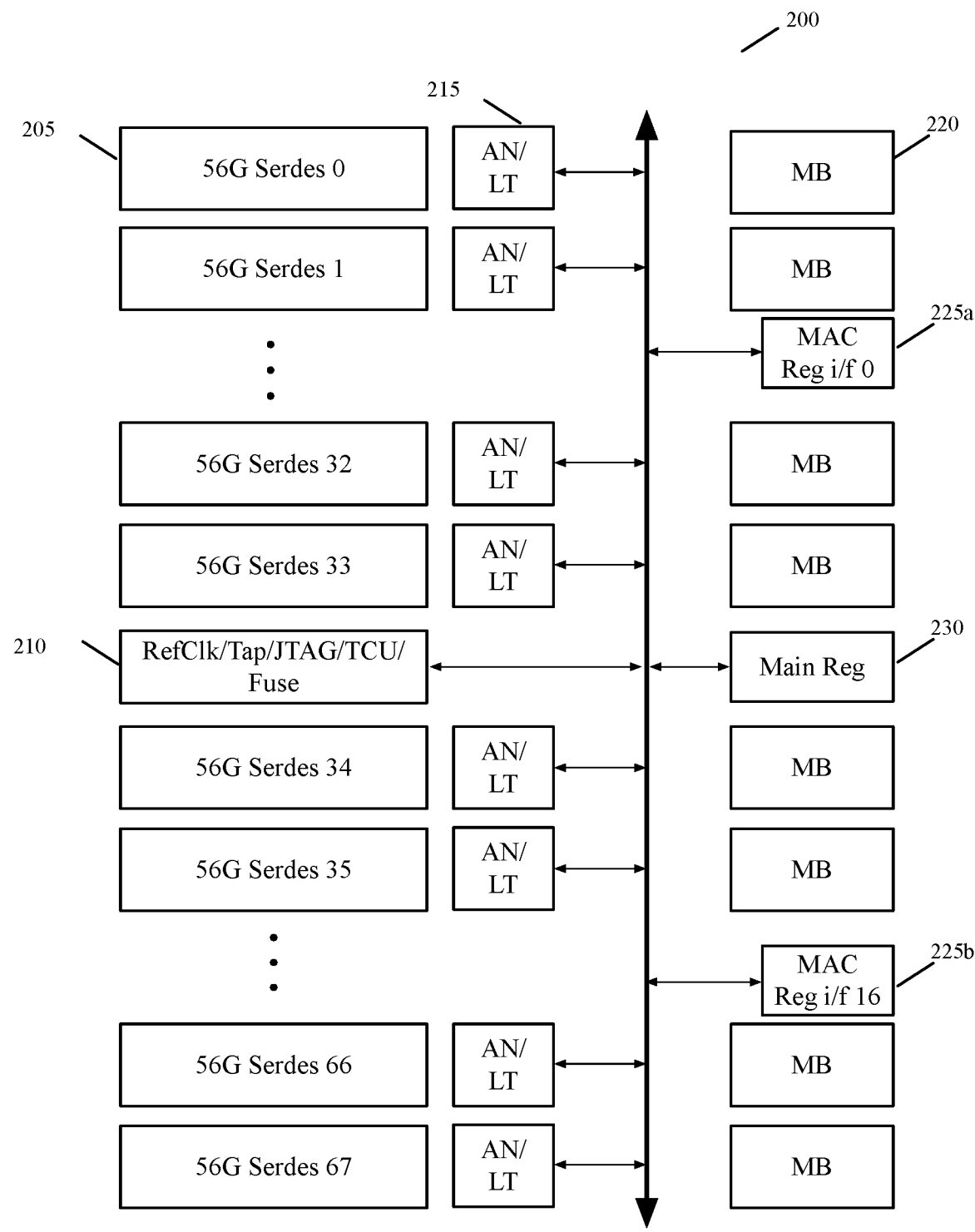
FIG. 2 conceptually illustrates functionality of a serializer/deserializer (SerDes) die.

Each SerDes die comprises multiple SerDes functional units. FIG. 2 illustrates a block diagram of a SerDes die using 68, 56 Gbps (56G) SerDes along with additional functions necessary for a SerDes die to support. FIG. 2 includes a set of 56G SerDes 205, a set of connections to GPIO interfaces 210, auto-negotiation and link training modules 215, microbumps 220, management interfaces 225 for sets of 56 Gbps SerDes, and a global management interface 230. Each 56 Gbps SerDes provides a SerDes service for 32 bits of data in both the transmit and receive direction sent with a frequency of approximately 1.75 GHz for a total of 56 Gbps. In other embodiments, pairs of 56 Gbps SerDes are replaced by a 112 Gbps SerDes that provides a SerDes service for 64 bits of data in both the transmit and receive direction sent with a frequency of approximately 1.75 GHz for a total of 112 Gbps. In other embodiments, pairs of 56 Gbps SerDes are replaced by a 112 Gbps SerDes that provides a SerDes service for 32 bits of data in both the transmit and receive direction sent with a frequency of approximately 3.5 GHz for a total of 112 Gbps.

GPIO interfaces 210 include interfaces for a reference clock (RefClk), a set of joint test access group (JTAG) interfaces for a test clock (TCK), test reset (TRST), test mode select (TMS), test data in (TDI), test data out (TDO), the set of JTAG interfaces collectively referred to as a test access port (TAP). Additional interfaces are described in Table 1 listing the IO pad interfaces.

TABLE 1

| Pin Name | I/O | Type | Description | Additional Information |
|---|---|---|---|---|
| ETH_TXPO . . . 67 | OUT | Pad | SerDes Differential Transmit (Positive) | Single IO PAD per SerDes. PAM4 encoding has 4 voltage level and will be represented in verilog as 2 bits. |
| ETH_TXNO . . . 67 | OUT | Pad | SerDes Differential Transmit (Negative) | PAM4 encoding has 4 voltage level and will be represented in verilog as 2 bits. |
| ETH_RXPO . . . 67 | IN | Pad | SerDes Differential Transmit (Positive) | PAM4 encoding has 4 voltage level and will be represented in verilog as 2 bits. |
| ETH_RXNO . . . 67 | IN | Pad | SerDes Differential Receive (Negative) | PAM4 encoding has 4 voltage level and will be represented in verilog as 2 bits. |
| ETH_REFCLKP | IN | Pad | Ethernet Reference clock (Differential Positive) | Main Reference clock of SerDes |
| ETH_REFCLKN | IN | Pad | Ethernet Reference clock (Differential Negative) | Main Reference clock of SerDes |
| ETH_RESET_N | IN | Pad | Asynchronous Reset | Asserted during power-on. Driven from Main-die at interposer (1.8V GPIO) |
| REFCLK_OUT | OUT | Pad | Reference clock output | Used to monitor ETH_REFCLKP/N through the clock observation pad located in main die. Driven from Main-die at interposer (1.8V GPIO) |

TABLE 1-continued

| Pin Name | I/O | Type | Description | Additional Information |
|---|---|---|---|---|
| JTAG_TCK | IN | Pad | JTAG Clock | Driven from Main-die at interposer (1.8V GPIO) |
| JTAG_TRST | IN | Pad | JTAG Reset | Driven from Main-die at interposer (1.8V GPIO) |
| JTAG_TMS | IN | Pad | JTAG TMS | Driven from Main-die at interposer (1.8V GPIO) |
| JTAG_TDI | IN | Pad | JTAG TDI | Driven from Main-die at interposer (1.8V GPIO) |
| JTAG_TDO_DAT | OUT | Pad | JTAG TDO DATA | Driven from Main-die at interposer (1.8V GPIO) |
| JTAG_TDO_EN | OUT | Pad | JTAG TDO Enable | Driven from Main-die at interposer (1.8V GPIO) |
| JTAG_TDO | OUT | Pad | JTAG TDO (Tristate able) | Driven from Main-die at interposer (1.8V GPIO) |
| RPR_SI | IN | Pad | Repair config chain in | Driven from Main-die at interposer (1.8V GPIO) |
| RPR_SO | OUT | Pad | Repair config chain out | Driven from Main-die at interposer (1.8V GPIO) |
| RPR_CLK | IN | Pad | Repair Clock | Driven from Main-die at interposer (1.8V GPIO) |
| RPR_RST | IN | Pad | Async reset only for repair chain | Driven from Main-die at interposer (1.8V GPIO) |
| TEST_SI | OUT | Pad | SCAN test Input | Driven from Main-die at interposer (1.8V GPIO) |
| TEST_SO0 | OUT | Pad | SCAN test Output | Driven from Main-die at interposer (1.8V GPIO) |
| TEST_SO1 | OUT | Pad | SCAN test Output | Driven from Main-die at interposer (1.8V GPIO) |
| TEST_SO2 | OUT | Pad | SCAN test Output | Driven from Main-die at interposer (1.8V GPIO) |
| TEST_SO3 | IN | Pad | SCAN test Output | Driven from Main-die at interposer (1.8V GPIO) |
| TEST_SE | IN | Pad | SCAN test Enable | Driven from Main-die at interposer (1.8V GPIO) |
| TEST_SHIFT_CLK | IN | Pad | SCAN test interface | Driven from Main-die at interposer (1.8V GPIO) |
| TEST_MODE | IN | Pad | SCAN test interface | Driven from Main-die at interposer (1.8V GPIO) |
| TEST_RSVD0 | IN | Pad | SCAN test interface | Driven from Main-die at interposer (1.8V GPIO) |
| TEST_RSVD_1 | IN | Pad | SCAN test interface | Driven from Main-die at interposer (1.8V GPIO) |
| TEST_EDT_UPDATE | IN | Pad | SCAN test interface | Driven from Main-die at interposer (1.8V GPIO) |
| TEST_EXTEST_MODE | IN | Pad | SCAN test interface | Driven from Main-die at interposer (1.8V GPIO) |
| TEST_OCC_SI | IN | Pad | SCAN test interface | Driven from Main-die at interposer (1.8V GPIO) |
| TEST_OCC_SO | OUT | Pad | SCAN test interface | Driven from Main-die at interposer (1.8V GPIO) |

Some IO pad interfaces in Table 1 are used for additional testing (e.g., wafer-sort testing and testing at final assembled part level (e.g., after mounting main and IO dies to silicon interposer)). The interfaces, in some embodiments, support (i) full TAP implementation (e.g., supporting 1149.1, 1149.6, 1500, and 1687 protocols), (ii) eFuse macro and Fuse Controller, (iii) scan implementation, memory built-in self test (BIST) and repair, (iv) loopback modes (e.g., testing from main die interface side and from the SerDes IO pad side), (v) robust interface testing (e.g., PRBS, BIST, etc.), (vi) data and clock redundancy control, (vii) boundary scan implementation, and (viii) characterization support.

Auto-negotiation and link training modules 215 implement auto-negotiation primitives (e.g., low-level function of page reception and transmission, better highest common denominator, forward error correction resolution, etc.) for each SerDes. Modules 215, in some embodiments, also provide asymmetric auto-negotiation and link training support across a group of 400 Gbps SerDes (either eight 56 Gbps or four 112 Gbps SerDes) with auto-negotiation and link training state machine for transmit and receive slices having a mechanism to exchange information. Link training is part of the SerDes die and is fully supported by each SerDes lane. In some embodiments, automatic transition from auto-negotiation to link training to mission mode are generated through the management interface which reconfigures the SerDes to the negotiated speed and trigger each function independently for each group of SerDes (a group being associated to a MAC, for instance eight 56G SerDes for a 400G MAC).

The microbumps of the main die, in some embodiments, are arranged so that they are mirrored on either side of the main die and rotationally invariant under a 180 degree rotation. IO dies, in some embodiments, are mounted in a first orientation to connect to a first side of the main die and a second rotated (by 180 degrees) orientation to connect to a second opposite side of the main die. In some embodiments, some SerDes lanes of the rotated die (e.g., a top- or bottom-most set of four 56 Gbps SerDes) do not connect to the main die in one orientation.

A novel protocol for performing register read and write access for different groups of SerDes (e.g., a group of 8 56 Gbps SerDes) within a SerDes die is provided for some embodiments. In some embodiments, the novel protocol uses a set of 5 pins as a management interface including a management clock input (MCI) sent from the main (core) die (tile) to the IO die (tile), a management data input (MDI) of the IO die used to command, address, and write data, a management clock output (MCO) of the IO die that sends the MCI clock back from the IO die to the main die in order to capture the management data output (MDO) from the main die, and a management data output (MDO) of the IO die used to read data back to the main die. The protocol includes transactions for read transactions, write transactions, reset transactions, control and status register (CSR) access, and an interrupt transaction.

Figure 3:
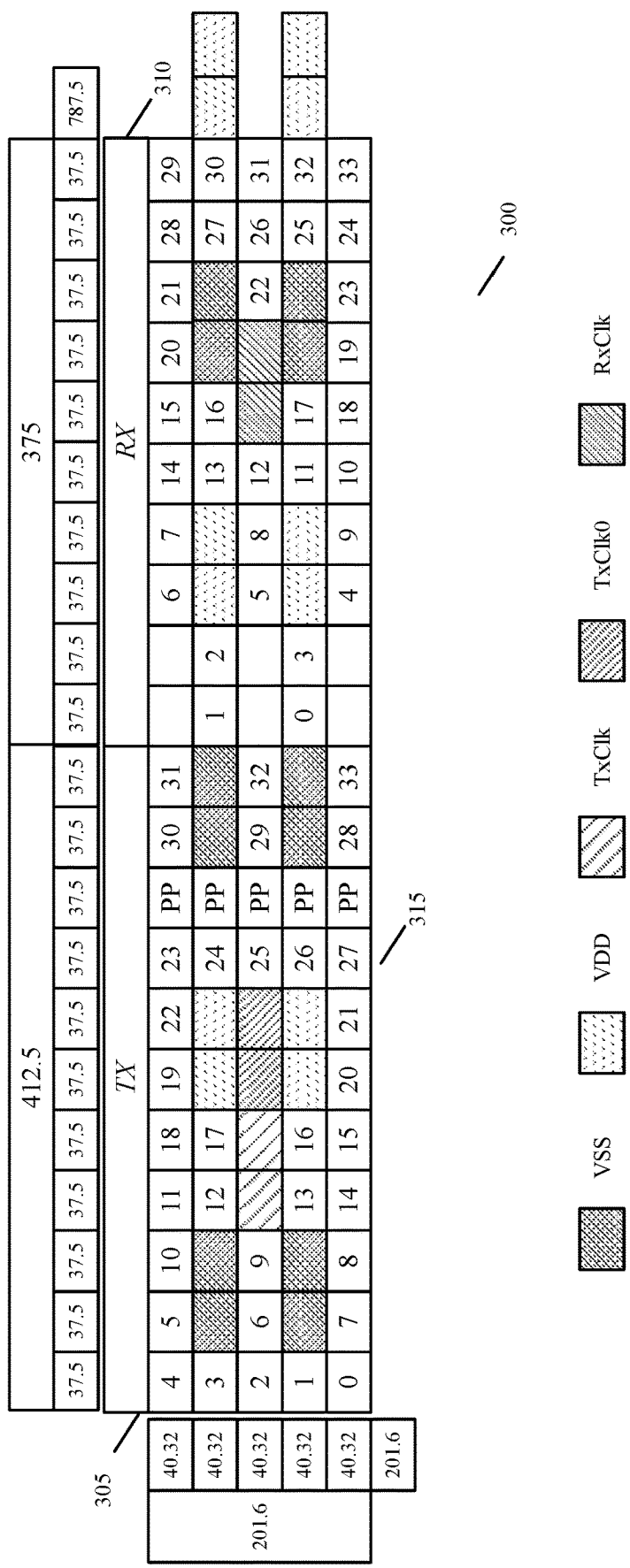
FIG. 3 illustrates a set of connections used by a single lane of a SerDes die.

FIG. 3 depicts a set of connections 300 used by a single lane of a SerDes die (e.g., one 56 Gbps SerDes). FIG. 3 depicts the connections labeled by their functionality. The individual boxes 315 are organized by their functionality, such as transmit (TX) connection group 305 and receive (RX) connection group 310. Each numbered connection 315 may be thought of as a bit that makes up the 32 bit SerDes (with two extra bits in each group of 32 bits for redundancy as is described below). Additional connections are made for a first transmit clock signal (TxClk), a second transmit clock signal (TxClkO) that is sent from the SerDes die to the main die for the main die to use as a transmit clock signal, a receive clock signal (RxClk), as well as a set of VSS connections, and a set of VDD connections. In the depicted embodiment, each clock signal has two connections, one primary connection and a secondary connection to provide redundancy because of the critical nature of the clock signals, while data bits have one redundant bit for every 16 bits. Thus, for the 32 bit data depicted in FIG. 3, two additional bits (e.g., bit 16 and bit 33) are provided as redundant bits in the case of bit failure. Redundancy, in some embodiments, will be implemented by muxing different data bits to adjacent micro bumps. Connections 315 marked PP are probe pad connections.

As shown, the connections in FIG. 3 are to be made with microbumps organized on the die edge. Data bits and clocks, in some embodiments, are organized in 5 rows of 8 columns of data with clocks in the middle. FIG. 3 depicts an inter-column distance of 37.5 microns and an inter-row distance of 40.32 microns. In some embodiments, the microbump pitch is approximately 40 microns and the microbumps are arranged in equilateral triangle configuration, such that column to column distance is 34.64 microns. Microbumps are arranged in 20 columns and 40 rows for each group of eight 56 Gbps SerDes in some embodiments.

In some embodiments, IO cells (CMOS buffers or inverters) are cell size D36 with ESD protection (50V CDM, 250V HBM), and 0.7V signaling. Wiring on the interposer, in some embodiments, uses redistribution layer (RDL) design rules with single-width, double-spacing (1W2S), with no need for shielding each wire in some embodiments. One of ordinary skill in the art would understand that instead of using 1W2S other embodiments use double-width, double-spacing (2W2S) or double-width, triple-spacing (2W3S). Special measures may need to be taken for clock signal routing such as 2W3S and/or shielding.

Figure 4:
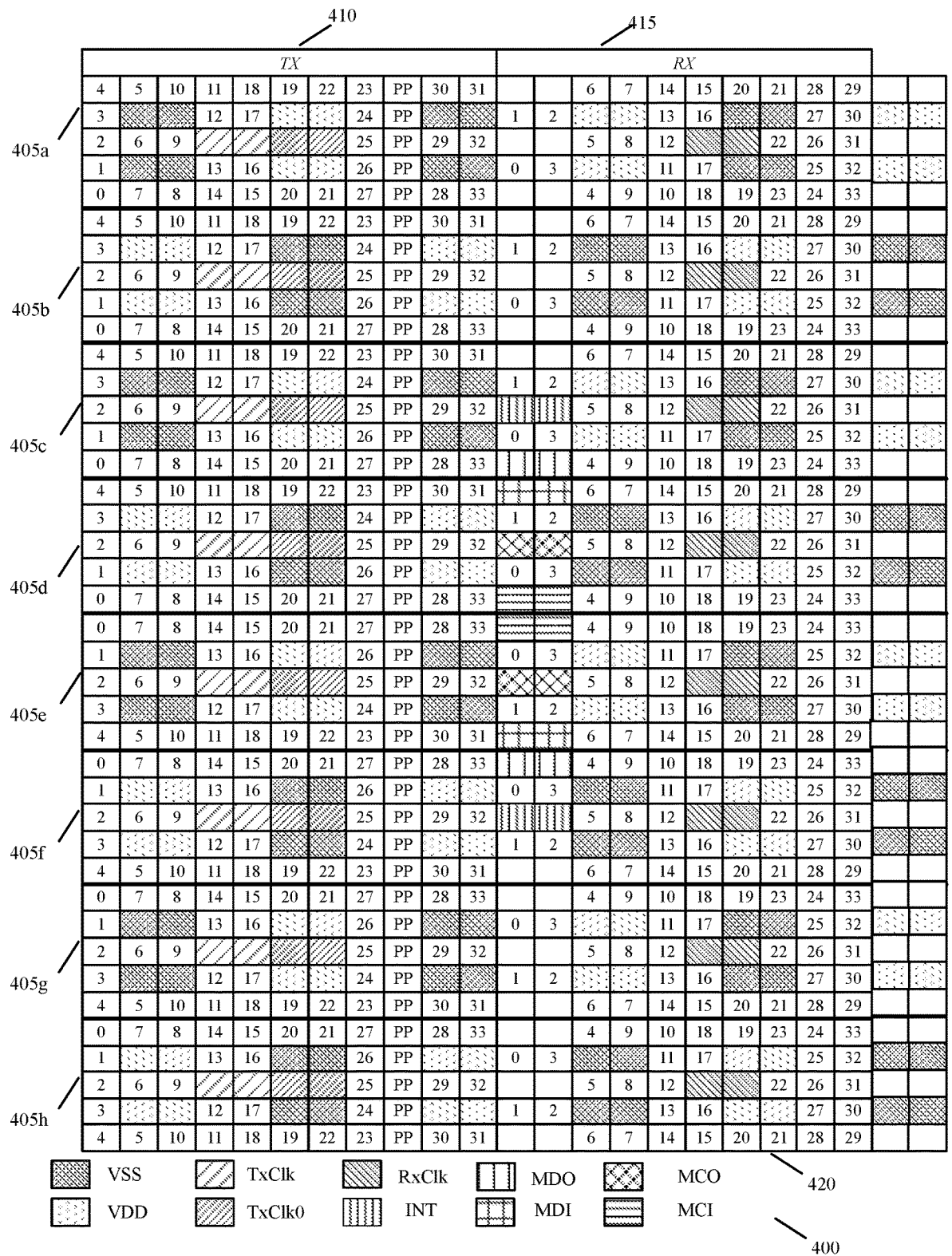
FIG. 4 illustrates a set of connections for a set of 8 lanes in a SerDes tile that includes a set of management interface connections.

FIG. 4 further depicts a set of 8 SerDes lanes (i.e., the eight 56 Gbps SerDes) that include the 5 connections for related management interfaces for the group of 8 SerDes lanes. As depicted in FIG. 3, each lane has a set of connections for 32 bits of data in both a receive group and transmit group (with an additional 2 bits of redundancy in each group) and clock connections. The central four lanes have additional connections for the management interfaces (including redundant connections, as the management interfaces are critical connections). Thus, the set of eight SerDes requires a total of 602 microbumps to form the connections with the described interfaces including 8 sets of (1) 34 transmit bits (32+2 redundant), (2) 34 receive bits (32+2 redundant), (3) 2 bits for a transmit clock signal (TxClk), (4) 2 bits for a transmit clock signal (TxClkO), and (5) 2 bits for a receive clock signal (RxClk), and a set of 10 management interface bits/microbumps (5 primary and 5 redundant). In some embodiments, power and ground use an additional 192 microbumps giving approximately 30% power to signal ratio and bringing the total number of microbumps used to 794 out of 800.

In some embodiments, the pin layout for a group of eight 56 Gbps SerDes is repeated eight times for the multiple sets of SerDes that make up the SerDes die. An additional group of four 56 Gbps SerDes is appended at one end of the SerDes die, and, in some embodiments, is not used for two (of four) of the SerDes dies attached to a main die. The pins/connections for the group of 4 SerDes are symmetrical around a central axis between two groups of two 56 Gbps SerDes and include pins/connections for a main management interface as well as a management interface for the four 56 Gbps SerDes.

Figure 5:
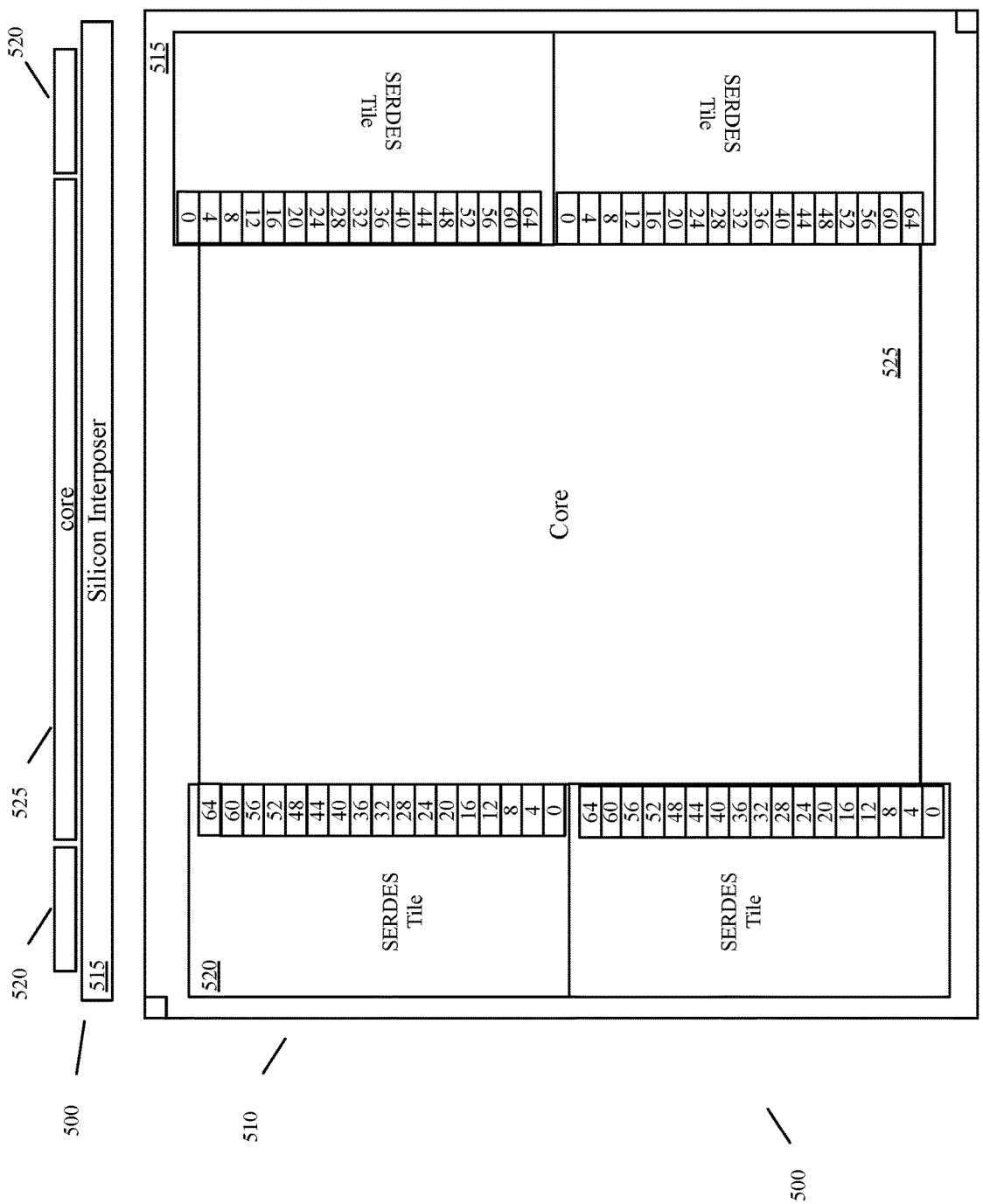
FIG. 5 illustrates one embodiment of a forwarding chip.

FIG. 5 depicts one embodiment of a forwarding chip 500 that includes silicon interposer 515, SerDes tiles (dies) 520, and main (core) die 525. Upper left SerDes tile 520 has 68-lanes numbered from 0 to 67, where lanes 0-3 are bottom most quad and lanes 64-67 are top most quad. The micro bump interface for these are presented such that bottom of the SerDes Tile has lane 0 and then other lanes in incremental order where micro bump interface for lane 67 is at the top edge. As shown in FIG. 5, lanes 64-67 are the four 56 Gbps SerDes group and are not attached for the upper left and lower right SerDes tiles 520. By arranging the SerDes tiles in this manner, the main (core) die 525 can have a symmetry about an axis running down the center of the die with the rotated SerDes die maintaining the proper connections based on the symmetry of the eight and four 56 Gbps SerDes groups.

In some embodiments, SerDes tiles 520 and main die 525 are placed in a face-to-face arrangement with the silicon interposer to form metal-to-metal connections between interfaces of the SerDes tiles 520 and main die 525, and of the silicon interposer 515. In some embodiments each of the interfaces of the silicon interposer 515 is a microbump. In some embodiments, one or more of the SerDes tiles 520 and main die 525 are placed in a face-to-back arrangement with the silicon interposer such that the connections to between the die (e.g., SerDes tile 520 or main die 525) and the silicon interposer is made through substrate of the die. Connections through a substrate, in some embodiments, include connections made using through silicon vias (TSVs) that connect the "back" of the substrate with interfaces of the "front" of the die.

Figure 6:
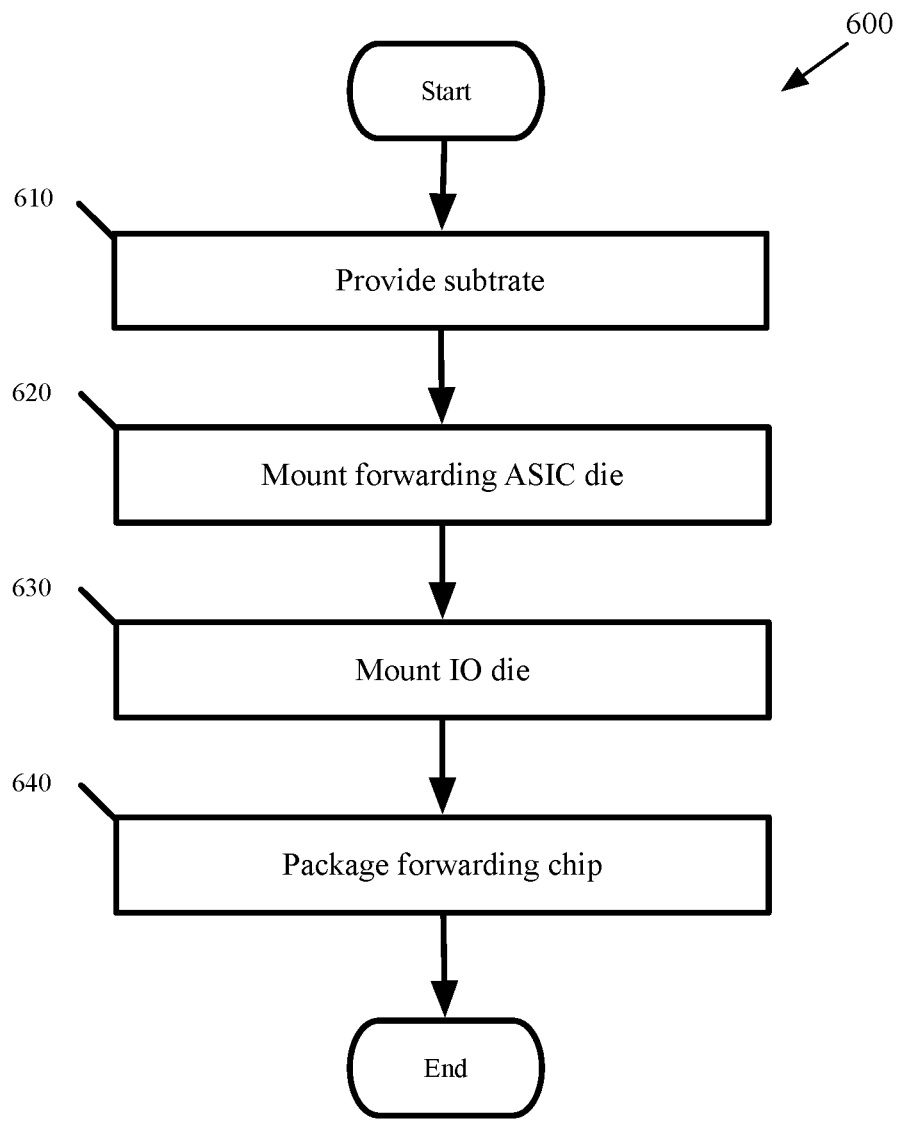
FIG. 6 conceptually illustrates a process for assembling a forwarding chip.

FIG. 6 conceptually illustrates a process 600 for assembling a forwarding chip as described above. Process 600 begins by providing (at 610) a substrate for the forwarding chip. In some embodiments, the substrate is a silicon interposer and wiring on the interposer uses redistribution layer (RDL) design rules with single-width, double-spacing (1W2S), with no need for shielding each wire in some embodiments. Special measures may need to be taken for clock signal routing such as double-width, triple-spacing (2W3S) and/or shielding. In some embodiments, the interposer uses three redistribution layers (RDL) for routing signals: top and bottom layers for signals, and the middle layer as shield. In some embodiments, 65 nm process designs rules will be used for the interposer, RDL metal using a width/spacing (W/S) equal to 0.4/0.4 microns and RDL VIA W/S equal to 0.36/0.34 microns, while single-width, double-spacing (1W2S) non-default routing (NDR) will be used for chip to chip wires.

A main die comprising a switching (forwarding) fabric is then mounted (at 620) on the substrate. In some embodiments connections between the substrate and the main die are made using microbumps. Some embodiments use an inter-column distance of 37.5 microns and an inter-row distance of 40.32 microns. In some embodiments, the microbump pitch is approximately 40 microns and the microbumps are arranged in equilateral triangle configuration, such that column to column distance is 34.64 microns. Microbumps are arranged in 20 columns and 40 rows for each group of eight 56 Gbps SerDes in some embodiments.

An IO die is mounted (at 630) to the substrate. The IO die, in some embodiments is a SerDes die (or tile) that provides an IO interface between the main die and external sources. The SerDes die in some embodiments is similar to those described above in relation to FIGS. 1 and 2. In some embodiments, the IO die converts a series of data bits received from external sources into a set of parallel data bits that is transmitted to the main die, and converts a set of parallel data bits received from the main die into a series of data bits that is transmitted to an external destination.

After the dies are mounted to the substrate the forwarding chip is packaged (at 640) to protect it from external conditions. In some embodiments, packaging the chip includes introducing an encapsulant and or a chip case to protect the dies and the connections between the dies and substrate from environmental factors such as moisture and foreign particles. It will be understood by one of skill in the art that the forwarding chip described above is attached to other chips in some embodiments and that alternative ordering of the die mounting steps may be used.

Further details of the structure and function of the SerDes tile, in some embodiments, is presented below. In some embodiments, the SerDes tile uses a source synchronous clocking scheme with data launch on the rising edge of the clock while capture occurs on the following rising edge of the clock. Each chip validates timing by regular Static Timing Analysis (STA) flow used for timing signoff. Chip to chip timing is validated using interposer extraction and flat chip to chip netlist/standard parasitic exchange format (SPEF) data. In some embodiments, portions of the core chip and SerDes tile chip are black boxed to optimize run time as long as it is not directly related to chip to chip interfaces being checked. Data and clock, in some embodiments, are forwarded from the tile to the core using a regular 1 cycle path scheme. Data launches on the clock rise edge and is captured on the next clock rising edge. For timing closure, a simple flop to flop 1 cycle path scheme is used in some embodiments with adequate margins on setup and hold times.

Tiles, in some embodiments, use level shifters for main die interface signals in both directions. It is assumed that the main die in general will be smaller technology nodes and hence will have different Vdd/Gnd. For example: tile voltage is 0.9V for 28 nm, core voltage is 0.75V for 7 nm, and proper level shifters are placed on both sides of the interface to take care of voltage difference and enable proper timing modeling.

As described above each 56G SerDes lane in some embodiments is 32b wide with a corresponding clock for receiving (Rx) and transmitting (Tx). Alternative speeds per SerDes in some embodiments are achieved with different combinations of data width and parallel clock frequency (e.g., 112 Gbps using 64 bits and 1.8 GHz, 28 Gbps using 32 bits and 900 MHz, 10.3125 Gbps using 16 bits and 644 MHz, or 1.25 Gbps using 8 bits and 156.25 MHz). In some embodiments using 1.25 Gbps, a SerDes is programmed at 10 Gbps with eight times downsampling logic implemented in the IO tile logic.

Figure 7:
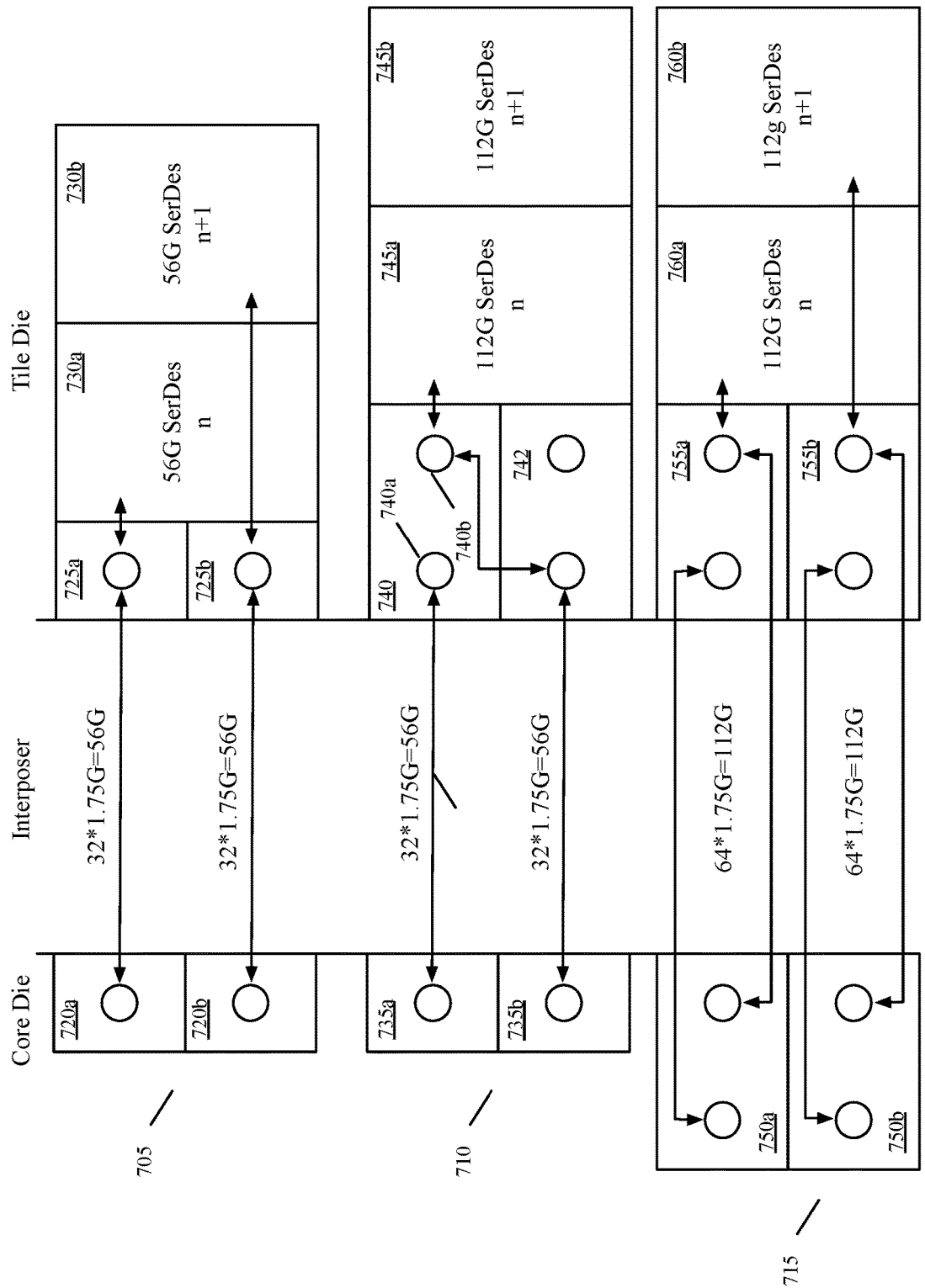
FIG. 7 illustrates different arrangements of SerDes tiles in embodiments of the forwarding chip that make use of different connections between the SerDes tiles and the main die.

FIG. 7 depicts different arrangements of SerDes tiles in embodiments of the forwarding chip that make use of different connections between the SerDes tiles and the Main die. Arrangement 705 reflects the embodiment discussed above in which each lane (e.g., set of 5 rows of microbumps 720 and 725) connects 56 Gbps SerDes 730 to the main die. Arrangement 710 is an alternative arrangement in which a single 112 Gbps SerDes 745 uses both rows of microbumps 735. Each 112 Gbps 745 has 64 bits to connect and the existing connections are made with 32 bit SerDes in mind. Thus, the connections for the second 112 Gbps 745*b* (i.e., microbumps 742) receive 32 bits of data meant for 112 Gbps SerDes 745*a* and forwards them (e.g., through the silicon interposer) to the second set of connections 740*b* for the second 32 bits for 112 Gbps SerDes 745*a*. Arrangement 715 is an alternative design for 64 bit data processing by each 112 Gbps SerDes. Microbumps 750 (and the main die interfaces/pins) connect to microbumps 755 which in turn connect to two 112 Gbps SerDes 760 for a next generation forwarding chip.

Figure 8:
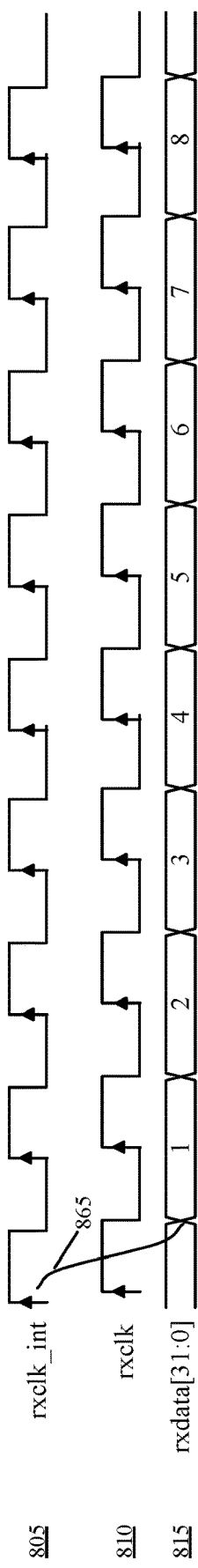
FIG. 8 illustrates a receive interface timing diagram using a source centered receive clock forwarding scheme.

FIG. 8 illustrates a receive interface timing/waveform diagram using a source centered receive clock forwarding scheme. Receive clock at internal node (rxclk_int) 805 is shown with a rising edge at the origin along the time axis, the output receive clock (rxclk) 810 is shown with an offset defined by the flop and delay chain, while receive data (rxdata) 815 represents the 32 bits of data captured on the rising clock edge. In some embodiments, the clock for the 32-bit data group is sent source synchronously. Data is delayed sufficiently through a programmable delay chain to enforce that data capture is always on the rising clock edge immediately following that of the data launch. All data bits are shifted, when necessary, through a programmable delay line on the clock generating the data at the launch side in order to fix potential hold issues. For the SerDes receive data output interface, the IO Tile, in some embodiments, must flop the SerDes received data using the recovered clock rising edge for the entire data bus (32b wide) before sending the data out to the microbumps. In some embodiments, the skew between the 32b Receive data bits must be tightly controlled and the flop must be part of the structured placement of a given microbump. The clock for these launch flops is a delayed (by programmable delay chain) version of the recovered clock.

Figure 9:
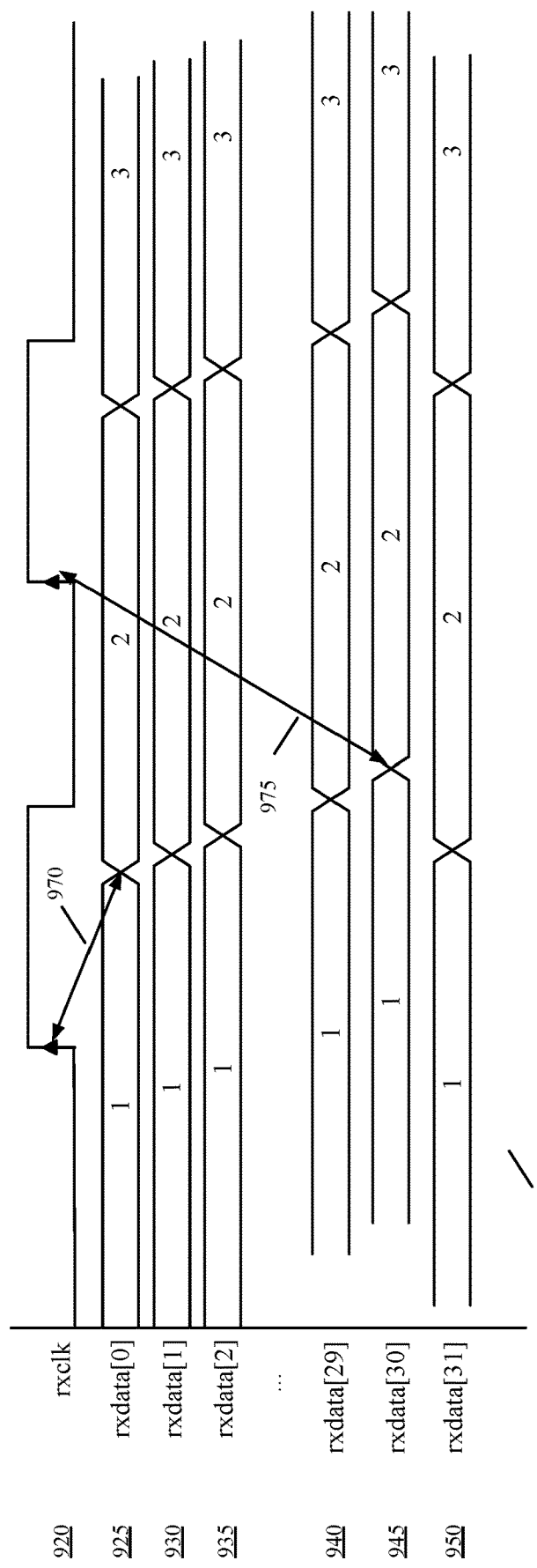
FIG. 9 illustrates a maximum setup and maximum hold timing budget.

FIG. 9 illustrates a maximum setup and maximum hold timing budget named rxclk_setup 975 and rxclk_hold 970. The programmable delay line is intended to fix hold timing issues on silicon (a debug feature). Each bit of the 32-bit clock group (i.e., bits 925-950) is defined with maximum setup and maximum hold timing budget named rxclk_setup and rxclk_hold. The original recovered clock is sent non-inverted as-is to the clock microbump (physically 2 microbumps for redundancy) without additional delays. This arrangement allows the Core Tile to capture the received data using the next rxclk rising edge.

Figure 10:
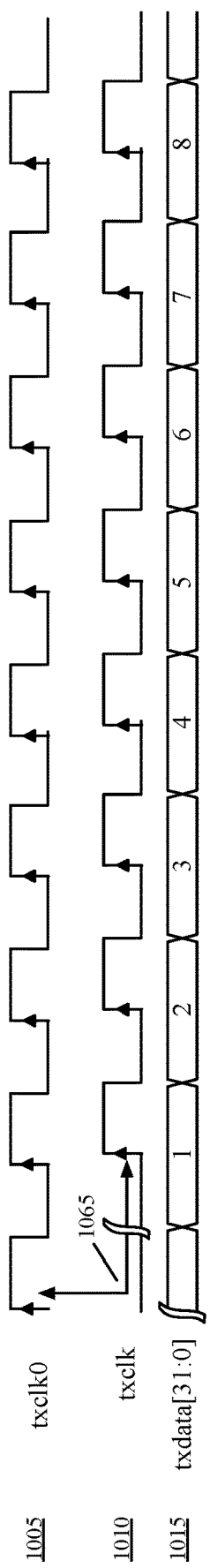
FIG. 10 illustrates a transmit interface timing diagram using a source centered transmit clock forwarding scheme.

In some embodiments, a SerDes tile sends its transmit phase locked loop (PLL) parallel clock (txclkO) to the core tile. The core tile uses the txclkO internally to send the data out to the IO tile along with the clock txclk. The clock txclk is an as-is version of the txclkO. The transmit data generation logic in the core tile behaves exactly the same as in the SerDes receive data output interface. FIG. 10 illustrates a transmit interface timing/waveform diagram using a source centered transmit clock forwarding scheme. SerDes transmit PLL parallel clock (txclkO) 1005 is shown with a rising edge at the origin along the time axis, the output transmit clock (txclk) 1010 is shown with an offset delay 1065, while transmit data (txdata) 1015 represents the 32 bits of data generated based on the rising clock edge.

In interacting with the core tile, in some embodiments, for the SerDes transmit data at the microbump interface, a single SerDes lane has a parallel interface that is 32-bit wide. The txclk 1010 and txdata 1015 are generated by the core tile which received the SerDes transmit PLL parallel clock (txclkO) 1005 from the IO tile. The txclkO rising edge clock is used to generate the 32-bit Tx data.

Figure 11:
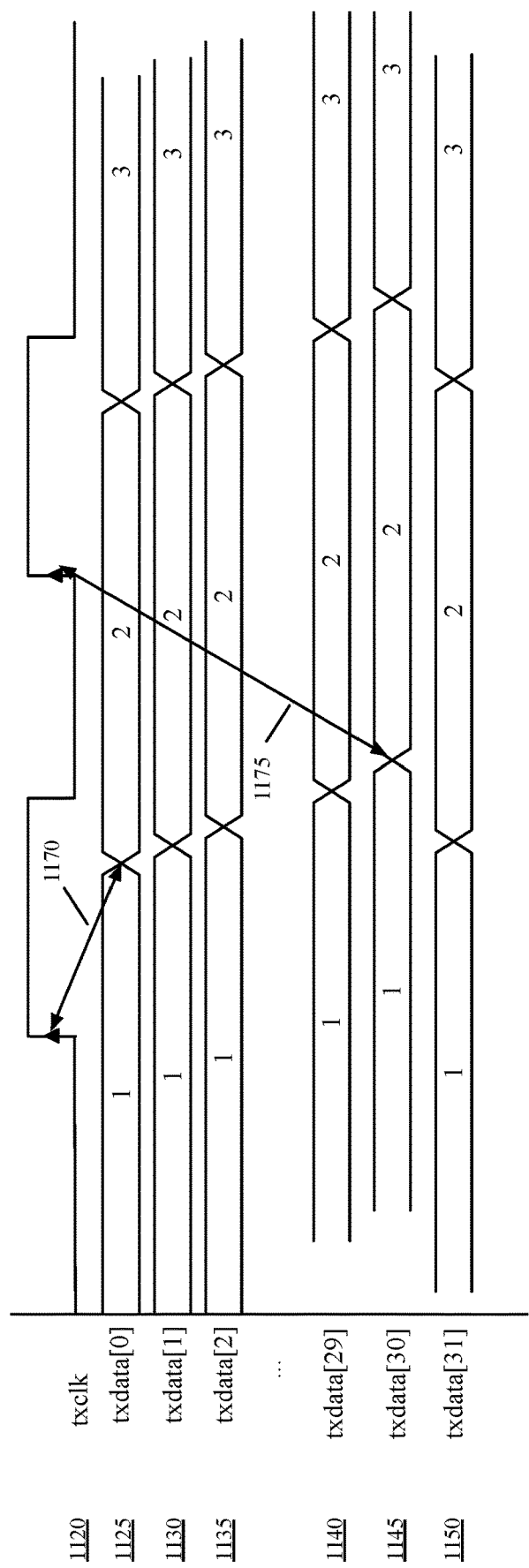
FIG. 11 illustrates a transmit clock setup that defines the setup time between the worst transmit data bit and a transmit clock rising edge, and defines a transmit clock hold that defines the hold time between the worst transmit data bit and the transmit clock rising edge.

FIG. 11 illustrates txclk setup 1175 that defines the setup time between the worst txdata bit 1145 and txclk 1120 rising edge and txclk hold 1170 that defines the hold time between the worst txdata bit 1125 and txclk rising edge. The IO Tile must capture the received 32-bit Tx data using the rising edge of the txclk input clock 1120 before sending the data to the SerDes Tx data parallel interface. The IO Tile must consider txclkO and txclk as mesochronous (0 ppm but unknown phase relationship) and thus implement a phase matching first in first out (FIFO) in the transmit data path (due to each die temperature/voltage difference, the phase between txclkO and txclk may vary). This Tx phase matching FIFO will avoid setup/hold issues.

Figure 12:
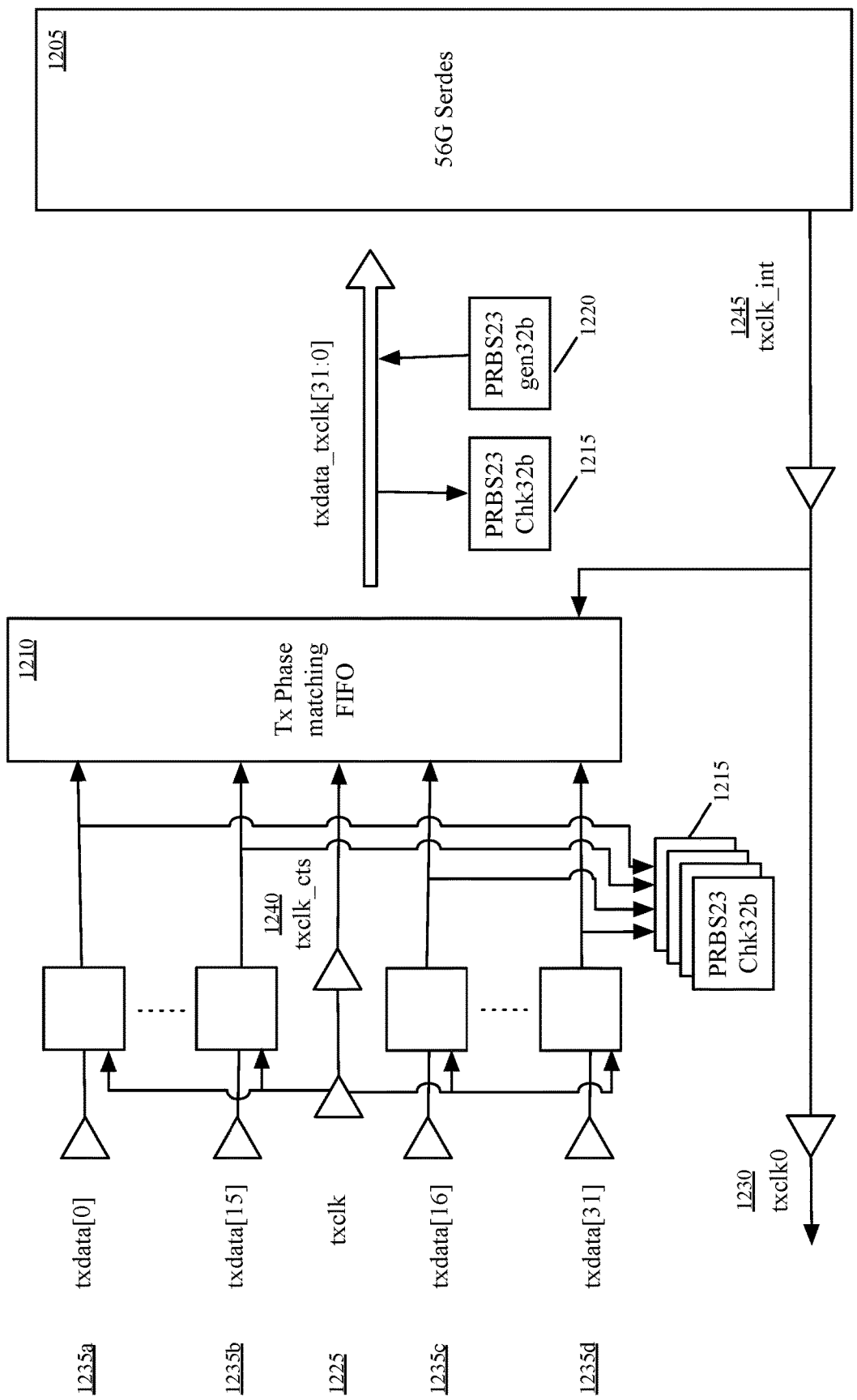
FIG. 12 illustrates a complete datapath for a transmit interface of some embodiments.

FIG. 12 depicts a complete datapath for a Tx interface in some embodiments. FIG. 12 depicts 56 Gbps SerDes 1205, Tx phase matching FIFO 1210, a set of pseudorandom binary sequence (PRBS) 23 checkers 1215, PRBS23 generator 1220, txclk 1225, txclkO 1230, txdata bits 1235, txclk_cts 1240, and txclk_int 1245. In some embodiments, the 32-bit Tx data bits 1235 include 2 redundant signals (1 per group of 16-bits) (not shown) whereas each clock has a fully redundant microbump (equaling 2 microbumps for txclkO 1230 and 2 microbumps for txclk 1225). Tx clock txclk 1225 is used as the capture clock of the Tx data from the Core die as well as the write clock to a phase matching FIFO 1210 (8 deep), which considers the 2 clocks (txclkO 1230 and txclk 1225) as fully asynchronous (but 0 ppm).

In order to check the sanity of the 32-bit Tx data group, in some embodiments, the IO Tile implements a pseudorandom binary sequence (PRBS) 23 checker 1215 across 32-bit data. In some embodiments, the PRBS checkers 1215 detects the PRBS invariant (all zeros) and considers that pattern as all errors. The PRBS checkers 1215, in some embodiments, also loads the received data into the PRBS state every clock cycle, or only when enabled in other embodiments. A PRBS23 generator 1220 is also implemented before connecting to the SerDes Tx data path. The PRBS23 generator 1220 is able to inject error through the register write operation. Both PRBS checker 1215 and generator 1220 are able to be enabled together (checking the data received from microbumps and sending generated data on the SerDes Tx interface).

Each group of SerDes lanes, in some embodiments, has its associated management interface composed of 5 pins, (1) a management clock input (MCI) sent from the Core Tile to the IO Tile, (2) a management data input (MDI) (of the IO Tile) used to send command, address, and write data, (3) a management clock output (MCO) (of the IO Tile) that sends back to the main die to capture MDO data output, (4) a management data output (MDO) (of the IO Tile) that is used to receive read data back to the core tile, and (5) an Interrupt (INT) output of the IO Tile.

Figure 13:
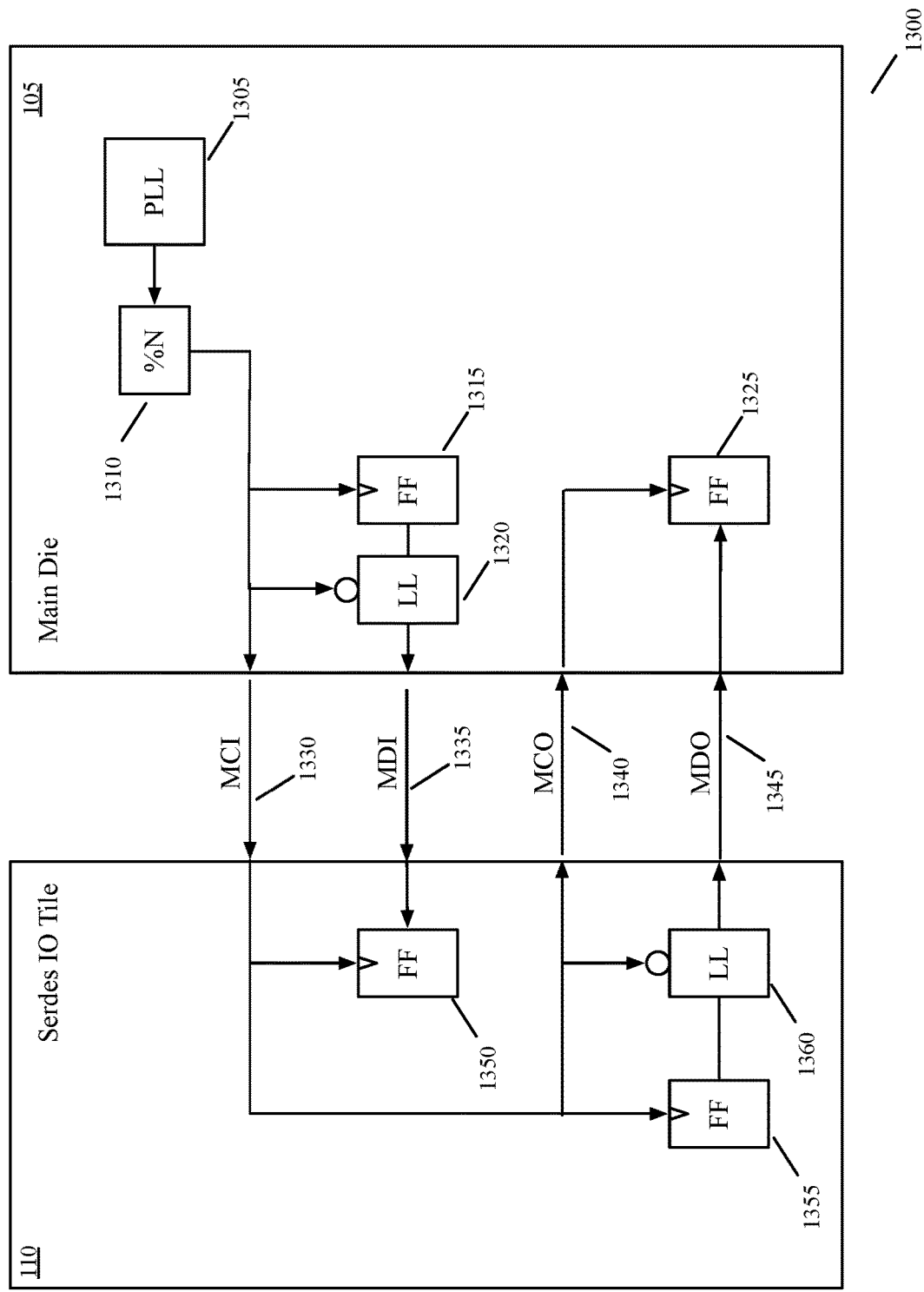
FIG. 13 illustrates a datapath for management interface clocking.

FIG. 13 illustrates a datapath for management interface clocking. FIG. 13 depicts main die 105, SerDes tile 110, MCI (1330), MDI (1335), MCO (1340), and MDO (#345) pins (datapaths) and a set of flip flops (1315, 1325, 1350, and 1325) and lockup latches (1320 and 1360) used to manage the timing of the different register interfaces. In some embodiments, the MCI clock is derived by dividing the Main die clock by 4, 8, 16, or 32 to limit the maximum interface frequency to 512 MHz or below. The MDI signal conveys the management data from the main die to the SerDes IO Tile and is generated on the same internal management clock rising edge as the MCI clock sent along with the data. After the output flop 1315 and before the MDI output buffer, a lockup latch 1320 is inserted to provide a 50% hold time margin and a 50% setup margin (the MCI clock is source centered compared to the data). In the case of a timing issue, the MCI clock frequency can be divided by up to 32 (e.g., approximately 50 MHz) for silicon debug adjustments.

The MCO clock is the MCI (input) clock sent back by the IO Tile to the Main die 105 in order to capture the MDO output data by the main die 105. The MDO data is generated by the SerDes IO Tile 110 to convey the read/write acknowledgement of the transaction as well as the read data for the Read operation. Similar to MCI/MDI, a lockup latch 1360 is added after the output flop 1355 driving the MDO output signal 1345 of the IO Tile. The lockup latch effectively delays the MDO data by ½ clock cycle and thus guarantees a 50% hold margin and a 50% setup margin. When there is no transaction, MDI signal is driven low by the Core Tile. Similarly, the MDO output of the Tile is asserted low by default. The MDO output will only be driven high by the IO tile during the read or write transaction.

In some embodiments, a register transaction is always initiated by the Core Tile and is 28-bits or 44-bits long and always starts with a preamble (2b) followed by a type (2b), address (24b), and, for a write transaction, data (16b). The preamble is the 2 bit Binary value '10' in some embodiments. Similar to MDIO (but far from identical), a register transaction is detected by the IO tile by detecting the Preamble on the MDI. Details of various transactions in some embodiments are provided below.

Figure 14A:
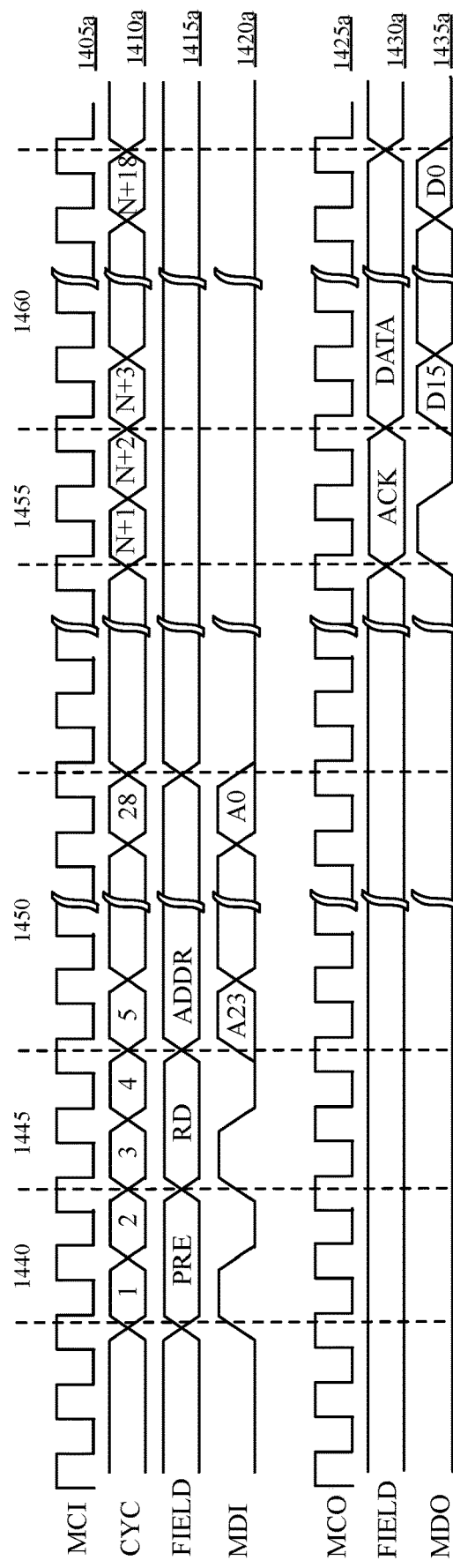
FIGS. 14A-B illustrate a timing diagram of a successful and failed read operation.
Figure 14B:
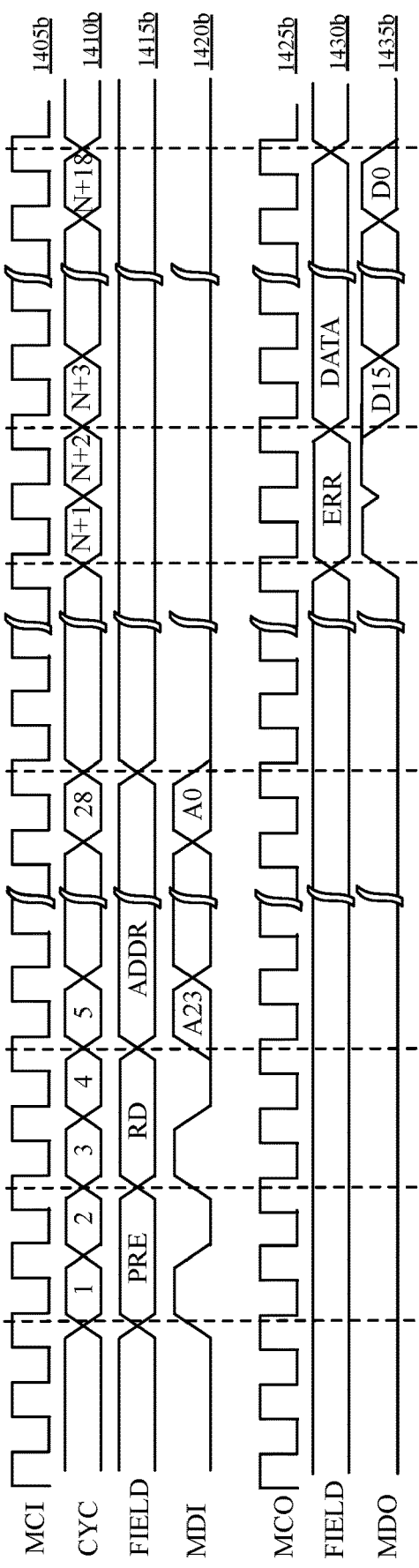

FIGS. 14A and 14B illustrate a timing diagram of a read operation (FIG. 14A) and a read operation with timing error (FIG. 14B). A read transaction is composed as follows, a 2-bit Preamble (e.g., '10') (at time 1440), a 2-bit Type (e.g., '10' opcode for read) (at time 1445), and a 24-bit address (at time 1450). A read transaction is completed by the IO Tile through the MDO pin and includes a 2-bit Preamble/Status (e.g., '10' for success, '11' for error) (at time 1455) and a 16-bit read data (at time 1460). All read commands are non-posted, and the Core Tile must wait for an ACK/ERR response completion before initiating the next command.

Figure 15A:
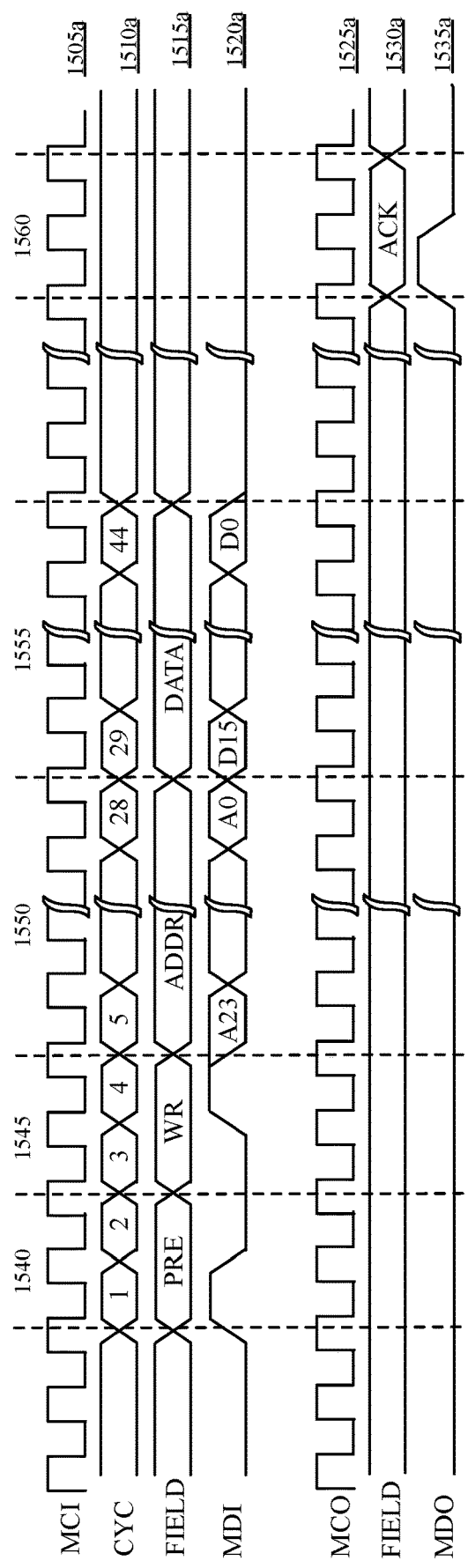
FIGS. 15A-B illustrate a timing diagram of a successful and failed write operation.
Figure 15B:
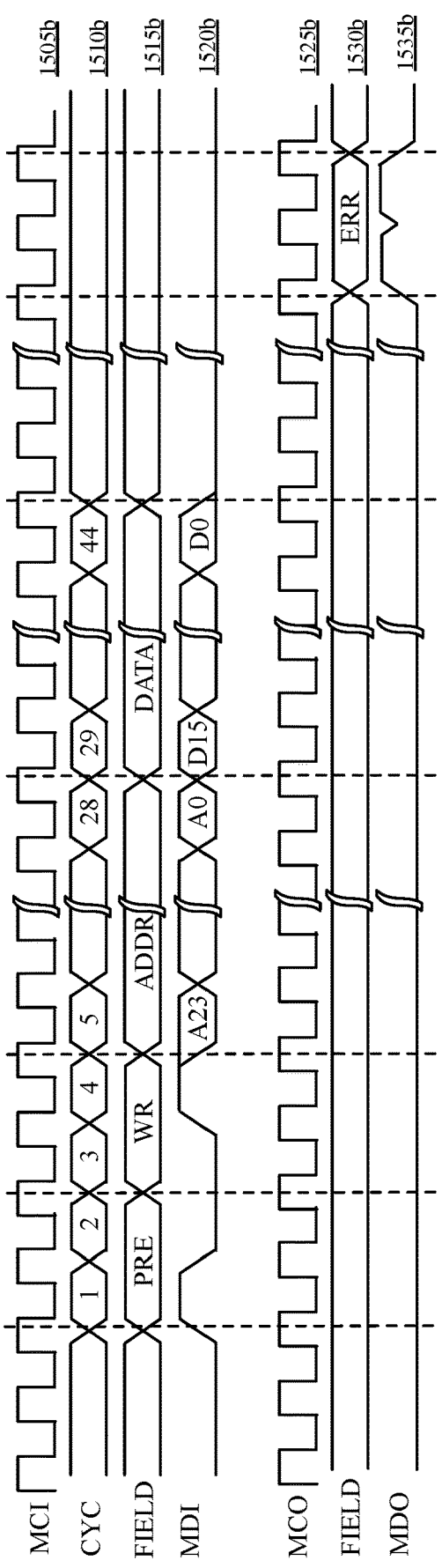

FIGS. 15A and 15B illustrate a timing diagram of a write operation (FIG. 15A) and a write operation with timing error (FIG. 15B). A write transaction is composed as follows, a 2-bit Preamble (e.g., '10') (at time 1540), a 2-bit Type (e.g., '01' opcode for write) (at time 1545), a 24-bit address (at time 1550), and a 16-bit write data (at time 1555). A write transaction is completed by the IO Tile through the MDO pin and includes a 2-bit Preamble/Status ('10' for success 1530*a*, '11' for error 1530*b*) (at time 1560).

All write commands are non-posted and the Core Tile must wait for an ACK/ERR response before initiating the next command. In some embodiments, write completion is used to backpressure a stream of write transaction. Every read/write operation, in some embodiments, is completed by the IO Tile either through a success status ('10') or through an error status ('11') within the time defined by the MDC INTERFACE TIMEOUT (128) MCI clock of the start of the transaction (from the end or previous transaction). Failure to achieve such requirements may potentially assert an interrupt in the Core Tile. The IO Tile also returns an ERROR status, in some embodiments, when there is something un-expected from the core, for example, for some reason, when the 1st set of 4 bits received from core is neither 1001(write) nor 1010(read). Otherwise, the core can get stuck if tile does not return anything.

Figure 16:
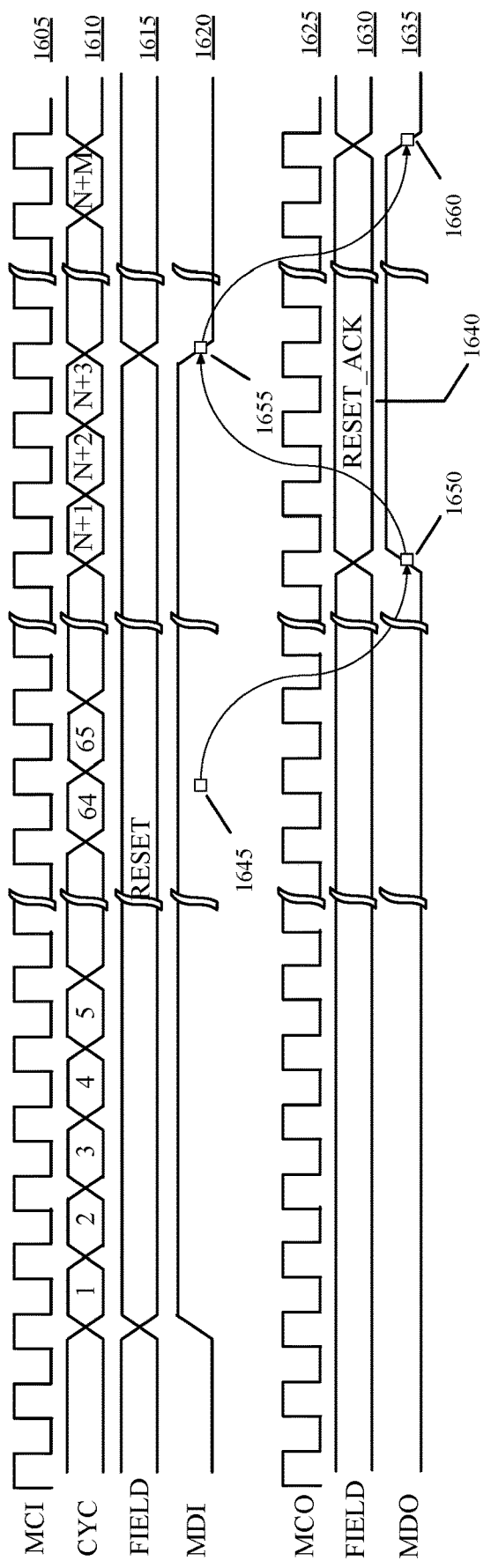
FIG. 16 illustrates a timing diagram for a reset operation.

FIG. 16 illustrates a timing diagram for a reset operation. FIG. 16 includes a depiction of the output for the MCI 1605, the MDI 1620, the MCO 1625, and the MDO 1635. FIG. 16 also indicates the reset request beginning at time 1645 (after 64 high bits from the MDI), a reset acknowledgment beginning at time 1650, and a reset end beginning at time 1655 In some embodiments, a reset transaction is enabled. For debug purposes, a reset transaction, in some embodiments, is detected by the IO Tile when the MDI is asserted as high for 64 MCI clock cycles. When such a transaction is detected, the IO Tile register interface must perform a soft reset of its internal state machine and assert the MDO high for as long as MDI is asserted high. The MDO output is generated from the flop output of the MCO clock within the maximum time defined by MCO2MDO, in some embodiments. The maximum skew allowed between MDC to MDI input flop (the difference between the path of the MDC to MDI input flop CK pin and the path from the MDI to MDI input flop D pin) is defined by the MCI2MDI time. The maximum frequency of MDC clock is defined by the MCI_CLOCK_PERIOD time.

Based on the IO Tile requirement, the MCI clock, in some embodiments, is turned off outside of any transaction. The Core Tile guarantees a minimum of 4 clock cycles before the start of any transaction and after the end of any transaction (as seen by the Core Tile register interface FSM) in order to handle any potential corner case condition. The IO Tile, in some embodiments, does not expect to have that MCI as a free running clock. However, the Core Die can guarantee 4 clocks are active before starting any transaction or after ending any transaction.

Assuming, for some embodiments, a MDC clock of 325 MHz, the register interface is able to perform one 16-bit register read/write operation every 200 ns approximately. That should allow a 64 kB SerDes firmware to load in 6.4 ms approximately. For SerDes firmware loading, the write instruction (with broadcast address) is intended to be used for the case where the register interface is used to control multiple SerDes lanes. In some embodiments, the register interface also includes the INT output pin of the IO Tile which should be asserted low by default (no interrupt pending). When asserted high (level), the Core Main die will transfer the interrupt request to the system bus through an interrupt.

The interrupt mechanism, in some embodiments, is specified by the IO Tile register specification but it must be accessible through the register interface with standard interrupt handling functions, (e.g. interrupt statuses which are RW1C (Read/Write 1 to Clear), interrupt enable, etc.). In some embodiments, the Interrupt Service Routine (ISR) must be able to find which interrupts have been asserted without polling every SerDes lane interrupt status register. Thus, in some embodiments, each register interface must contain a first level interrupt status register which will specify the indirection to a second level interrupt status (which may be per lane or per function).

Each SerDes is able to provide critical status interrupts to the interrupt mechanism, including interrupts for Tx PLL loss of lock (Tx LOL), CDR loss of lock (Rx LOL), Rx Loss of Signal (not Rx Signal OK), Rx Signal Detected, Rx Not Ready, Tx Not Ready, Auto-Negotiation interrupt, Link Training interrupt, etc. When any interrupt is asserted, the INT pin is asserted by the IO Tile until all interrupts are cleared by the ISR. The INT microbump is shared across 8 SerDes lanes (except for the upper last 4 SerDes lanes) and the corresponding first level Interrupt Status register (first register read by the ISR). For SerDes interrupt and auto-negotiation/link training interrupt, a second level interrupt status per lane should report which type of interrupt has been asserted.

Due to the flexible mapping of logical lane to independent physical Rx and Tx part of the SerDes function, the address map decode is logical and not physical in some embodiments. Interrupt register mapping is also logical, not physical. Due to the Ethernet MAC IP requirement to get the RxSignalOK (Signal Detect or invert of loss-of-signal) information per SerDes lane accurately, the core die implements the hardware state machine which automatically polls the RxSignalOK status of all 8 lanes belonging to the same 400G MAC/PCS. This register is common to all 8 SerDes lane (1 bit per lane) and assigned logically. The FSM will enable the RxSignalOK as a virtual wire between the IO Tile and the Core die by regularly polling this common register. Similarly, any other information which may need to be useful to the PCS/MAC (SerDes Ready), in some embodiments, is polled automatically. Such polling would need to be specified by the IO Tile vendor through their IO Tile specification document.

In some embodiments, the main die may decide to react on INT microbump signal assertion to process the loss-of-signal as a traditional interrupt (this will require the SerDes IO Tile to be able to report an interrupt when SignalDetect reports either "loss of signal" or "signal detected"). As each interrupt can be masked individually, the switch may decide to rely on one mechanism or the other.

The main register interface is similar to the other management interfaces. In some embodiments, this main register interface enables access to only top-level registers which are not SerDes (or a group of 4/8 SerDes) specific. The main register interface, in some embodiments, cannot access SerDes registers. This main register interface programs the logical to physical mapping of all SerDes lane for all group of 8 SerDes (or 4 SerDes for the upper quad) and programs the reference clock output going to the main die for clock observation purpose, trigger BIST, etc.

Both the main register interface and each management interface can access the internal system bus of the IO Tile. The System Bus, as well as all SerDes Register Bus or logic controlling side band signals, are operated out of the ETH_REFCLK_P/N differential clock running at 156.25 MHz. That will require implementation of a clock domain crossing between each Management interface MDC clock and system bus clock (each register interface only has one transaction at any given time which should make this CDC simple).

The main register interface only addresses top-level registers and thus the MSB address bit is not intended to be used as broadcast command. In some embodiments, a SerDes IO Tile vendor provides a register description for all top-level registers. The register interface has a 24-bit address field that is a word address (word is defined as 2B quanta corresponding to the 16-bit data bus width). Each management interface can only access 8 SerDes address spaces, which forces address bit [22:19] to always be set to 0. For the upper register interface, which only has 4 SerDes, bit [22:18] will be forced to 0.

The 8 most significant address bits (MSB) of the management interface are used as follows: bit [23] is a broadcast bit when set, bit [22:16] are the SerDes ID. For the management interface of some embodiments, the SerDes ID will range from 0 to 7. Only the Broadcast Write operation is permitted for the register interface (any Broadcast Read operation result is undefined). That leaves 16-bit local addressing for each SerDes (this is assuming that there is no common logic to a group of 8 SerDes lanes). In embodiments that have a common logic to a group of 8 SerDes lanes, those common registers are assigned to the logical SerDes 0 address space, additional options will be understood by one of skill in the art.

For each register interface shared by 8 (4) SerDes, the main die will only be able to address directly 128 KB. That leaves 16 KB per SerDes lane (assuming 8 SerDes maximum controlled by a single register interface). The SerDes ID which is the 3 MSB of the PCIe 128 KB address space will be mapped to register interface protocol address bit [18:16] and the PCIe address bit [13:2] will be mapped to the register interface protocol bit [11:0]. That will leave bit [15:12] set to 0 for direct map register access (4K 16-bit register per SerDes can be directly mapped).

All upper SerDes registers (from 4K to 64K where address bit [15:12] are non-zero) will be indirectly mapped. A single access to any of those registers will take many PCIe register transactions (and handshakes on a busy bit). Thus, system performance will be reduced for those registers. Directly mapped registers are used for all functions used during mission mode of the SerDes, including Auto Negotiation, Link Training, Interrupts, etc. An indirectly mapped register is used for a debug/test or microcontroller firmware.

While the invention has been described with reference to numerous specific details, one of ordinary skill in the art will recognize that the invention can be embodied in other specific forms without departing from the spirit of the invention. For instance, FIG. 6 conceptually illustrates a process. The specific operations of this process may not be performed in the exact order shown and described. The specific operations may not be performed in one continuous series of operations, and different specific operations may be performed in different embodiments. Furthermore, the process could be implemented using several sub-processes, or as part of a larger macro process.

What is claimed is:

1. A forwarding chip comprising:
    a core first application-specific integrated circuit (ASIC) die comprising switching fabric to perform forwarding operations of the forwarding chip;
    an input-output (IO) second ASIC die in communication with the core first ASIC die to serve as an IO interface of the core first ASIC die;
    a substrate on which the first and second ASIC dies are mounted and through which they communicatively couple; and
    a chip encapsulating member for encapsulating the first and second ASIC dies and substrate in a chip housing, wherein:
        the input-output second ASIC die includes an arrangement of microbumps with associated functionality,
        the arrangement of microbumps with associated functionality is symmetrical about a central axis of the input-output second ASIC die that separates a first top set of lanes and a second bottom set of lanes, and
        a microbump is associated with a first functionality and a second microbump is associated with a second and different functionality than that of the first functionality.

2. The forwarding chip of claim 1 wherein the substrate comprises a silicon interposer through which the core first ASIC die connects to the input-output second ASIC die.

3. The forwarding chip of claim 2, wherein the silicon interposer further comprises a set of microbumps used to form connections between the core first ASIC die and the input-output second ASIC die.

4. The forwarding chip of claim 1, wherein the core first ASIC die is a switching ASIC die.

5. The forwarding chip of claim 1, wherein the input-output second ASIC die is a serializer/deserializer (SerDes) ASIC die.

6. The forwarding chip of claim 1, wherein the input-output second ASIC die is one of a plurality of input-output ASIC dies connected to the core first ASIC die through the substrate.

7. The forwarding chip of claim 1, wherein the core first ASIC die uses a semiconductor processing node size that is less than a node size used by the input-output second ASIC die.

8. The forwarding chip of claim 1, wherein connections to the core first ASIC die comprise:
    a first set of connections comprising connections for (i) a set of transmit bits and (ii) a set of transmit clock data, wherein the connections for the set of transmit bits are arranged around the connections for the set of transmit clock data; and
    a second set of connections comprising connections for (i) a set of receive bits and (ii) a set of receive clock data, wherein the connections for the set of receive bits are arranged around the connections for the set of receive clock data.

9. The forwarding chip of claim 8, wherein a critical connection has a redundant connection, and wherein groups of noncritical connections share a redundant bit.

10. The forwarding chip of claim 9, wherein connections for clock data are critical connections and connections for transmit and receive bits are noncritical connections.

11. The forwarding chip of claim 1, wherein the core first ASIC die includes an arrangement of microbumps that is mirrored on each of two sides of the core first ASIC die.

12. The forwarding chip of claim 11, wherein a third input-output ASIC die in a plurality of input-output ASIC dies connects to the core first ASIC die in an orientation that is rotated approximately 180 degrees around an axis normal to a surface of the third input-output ASIC die relative to the input-output second ASIC die, so that the third input-output ASIC die connects to correct microbumps that form a connection between the core first ASIC die and the third input-output ASIC die.

13. A method of making a forwarding chip package comprising:
    providing a substrate to support components of the forwarding chip package;
    mounting a core first application-specific integrated circuit (ASIC) die to the substrate, the core first ASIC die comprising a switching fabric for performing forwarding operations of a forwarding chip;

mounting an input-output second ASIC die to the substrate to connect the input-output second ASIC die to the core first ASIC die, the input-output second ASIC die in communication with the core first ASIC die for serving as an IO interface of the core first ASIC die; and encapsulating the substrate and the first and second ASIC dies with an encapsulating member comprising a chip housing, wherein:

the input-output second ASIC die includes an arrangement of microbumps with associated functionality, the arrangement of microbumps with associated functionality is symmetrical about a central axis of the input-output second ASIC die that separates a first top set of lanes and a second bottom set of lanes, and a microbump is associated with a first functionality and a second microbump is associated with a second and different functionality than that of the first functionality.

14. The method of claim 13, wherein the substrate includes a silicon interposer through which the core first ASIC die connects to the input-output second ASIC die.

15. The method of claim 14, wherein the silicon interposer further comprises a set of microbumps used to form connections between the core first ASIC and the input-output second ASIC.

16. The method of claim 13, wherein the core first ASIC die includes a switching ASIC die.

17. The method of claim 16, wherein the input-output second ASIC die includes a serializer/deserializer (SerDes) ASIC die.

18. The method of claim 17 further comprising:

mounting an input-output third ASIC die to the substrate to connect the input-output third ASIC die to the core first ASIC die.

19. The method of claim 18, wherein an arrangement of microbump functionality on the core first ASIC die is mirrored on each of two sides of the core first ASIC die.

20. The method of claim 19, wherein the input-output third ASIC die in a plurality of input-output ASIC dies is mounted in an orientation that is rotated approximately 180 degrees around an axis normal to a surface of the input-output third ASIC die relative to the input-output second ASIC die, so that the input-output third ASIC die connects to correct microbumps that form a connection between the core first ASIC die and the input-output third ASIC die.

21. The method of claim 13, wherein connections to the core first ASIC die comprise:

a first set of connections comprising connections for (i) a set of transmit bits and (ii) a set of transmit clock data, wherein the connections for the set of transmit bits are arranged around the connections for the set of transmit clock data; and a second set of connections comprising connections for (i) a set of receive bits and (ii) a set of receive clock data, wherein the connections for the set of receive bits are arranged around the connections for the set of receive clock data.

22. The method of claim 21, wherein each critical connection has a redundant connection, and wherein groups of noncritical connections share a redundant bit.

23. The method of claim 22, wherein connections for clock data are critical connections and connections for transmit and receive bits are noncritical connections.

* * * * *